No. 796,053. PATENTED AUG. 1, 1905.
T. DUNCAN.
ELECTRICAL MEASURING INSTRUMENT.
APPLICATION FILED AUG. 26, 1901. RENEWED JAN. 7, 1905.
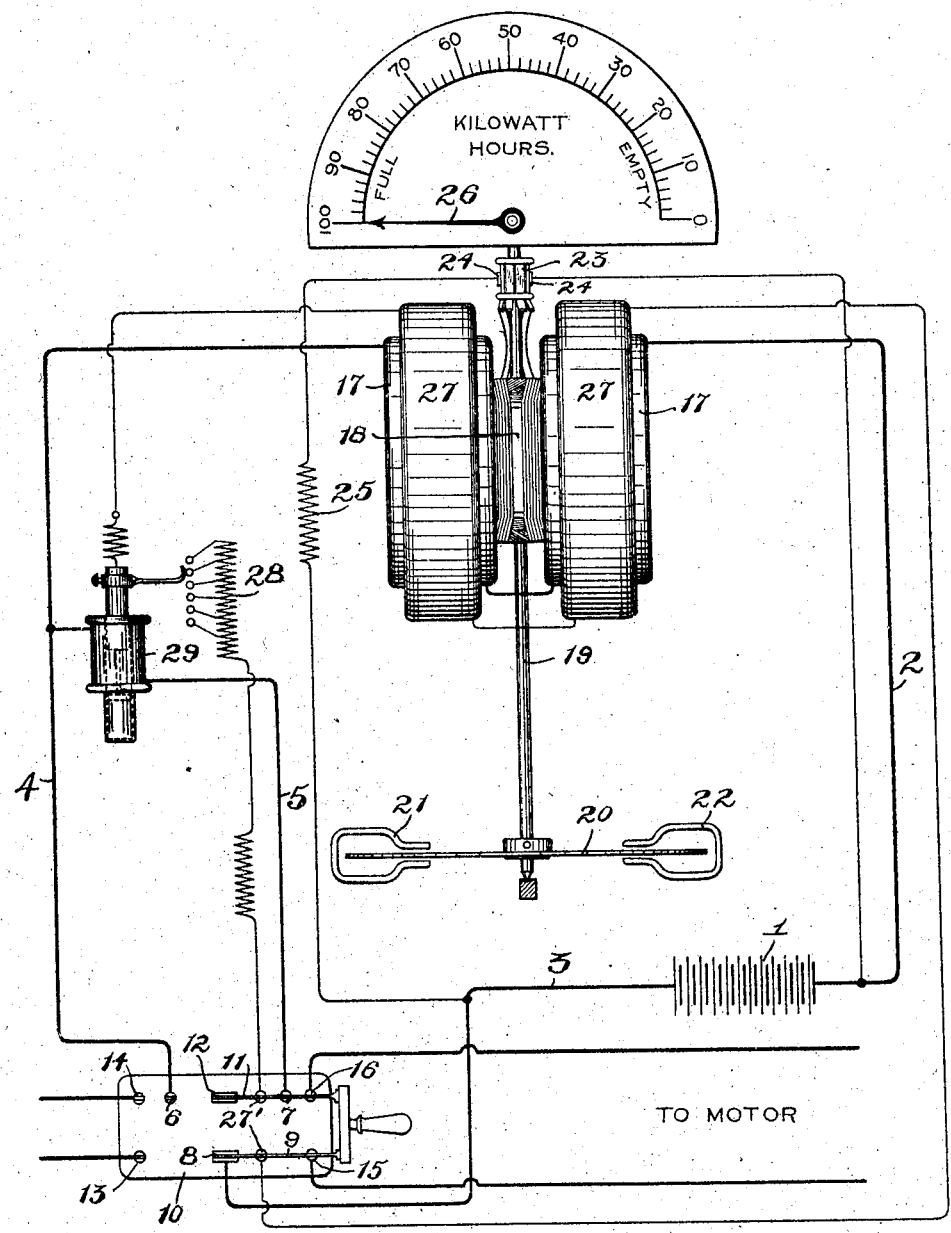
WITNESSES:
Max W. Zabel.
Harvey L. Hanson.
INVENTOR
Thomas Duncan
BY Charles A. Brown Cragg & Belfield
ATTORNEYS.

UNITED STATES PATENT OFFICE.

THOMAS DUNCAN, OF CHICAGO, ILLINOIS.

ELECTRICAL MEASURING INSTRUMENT.

No. 796,053.        Specification of Letters Patent.        Patented Aug. 1, 1905.

Application filed August 26, 1901. Renewed January 7, 1905. Serial No. 239,976.

*To all whom it may concern:*

Be it known that I, THOMAS DUNCAN, a citizen of the United States, residing at Chicago, in the county of Cook and State of Illinois, have invented a certain new and useful Improvement in Electrical Measuring Instruments, of which the following is a full, clear, concise, and exact description, reference being had to the accompanying drawings, forming a part of this specification.

My invention relates to meters adapted for use in connection with storage batteries, and has for its object the provision of a meter that is adapted to rotate at different rates of speed per unit of load or energy upon variations in the rate of battery discharge.

By means of my invention the meter is caused to operate at an increased rate of speed per unit of load or energy upon an increase in the rate of discharge.

In the use of storage batteries it is well known that the output of the battery will always be less than the energy stored therein and that the battery loss will increase upon a sufficient increase in the rate of battery discharge. For example, if the battery is charged one thousand ampere-hours at its normal rate of charge—say one hundred amperes for ten hours—the total discharge at the same rate which can be made available without harm to the battery will not be more than about eighty per cent. of the energy charged into the battery with some makes of battery, this battery loss varying with different makes—that is, the battery will effectively operate at one hundred amperes per hour for eight hours, giving out eight hundred ampere-hours after having received one thousand. If the rate of discharge is increased, the total output will be diminished. For example, with certain makes of battery the energy discharged will not be over about seventy per cent. if the rate is increased to one hundred and forty amperes, sixty per cent. if the rate of discharge is doubled, and forty per cent. if the rate of discharge is quadrupled.

I have provided an instrument that is adapted to compensate for the varying battery losses due to the varying rates of discharge, so that the user of the battery may know when the available energy in the battery is spent. Ordinarily a meter associated with a storage battery that is discharged at varying rates will indicate the presence of more energy in the battery than actually exists. The meter of my invention is also adapted to measure the energy that is being stored in the battery, the meter when thus associated with the charging source of current being operatively dissociated from the means that cause the meter to operate at varying rates of speed per unit of load or energy at different rates of discharge.

The meter of my invention is particularly adapted for use in connection with motors employed in operating motor-vehicles where the rate of discharge is not constant, but is liable to be changed at any time.

In my present invention I employ means for producing a variable compensating torque, for producing a variation in the rate of operation of the meter, said means being automatically controlled by means subject to the variable volume of current flowing from the battery. For this purpose I prefer to employ a supplemental field-winding, preferably subject to the battery-pressure, and arrange a rheostat in circuit therewith. A controlling-solenoid in series with the battery only when discharging serves to include more of said resistance in circuit with the supplemental winding when the battery discharge is reduced, portions of the resistance being excluded when the battery discharge increases, whereby the torque of the instrument is modified to produce rates of operation of the meter commensurate with varying battery discharge.

I will explain my invention more fully by reference to the accompanying drawing, which is a diagrammatic view of a storage-battery system with the meter of my invention associated therewith.

In the drawing a storage battery 1 is illustrated having mains 2 and 3. The main 2 is provided with bifurcated branches 4 5, terminating in contacts 6 and 7, while the main 3 terminates in a pivotal mounting 8, upon which a switch-blade 9 of a switch 10 is secured. A second switch-blade 11 of the switch 10 is also placed upon a pivotal mounting 12. Terminals of a charging-circuit 13 and 14 are illustrated. Terminals 15 and 16 of conductors leading to translating means, as the motor of a motor-vehicle, are also illustrated.

When the switch 10 is thrown to the left, the charging-machine or source of current is thrown into circuit with the storage battery. When the switch is thrown to the right, the storage battery is thrown into circuit with the translating means.

I have illustrated a meter having a current-winding included in the main 2, this current-winding being subdivided into coils 17 17. The meter is also provided with a pressure-winding 18, included in bridge between the battery leads or mains. These windings of the meter are constantly in circuit with the battery irrespective of its association with the charging-machine or the translating means. The meter-winding 18 is preferably in the form of an armature and is mounted upon a spindle 19, at the lower end of which is provided a disk 20, arranged within the fields of damping-magnets 21 22. The shaft 19 also carries the commutator 23, against which bear brushes 24 24, that serve to include the armature of the meter in circuit, a choking resistance 25 being also included in circuit with the armature.

The meter is provided with gearing at its upper end to actuate the measuring-index 26, which by coöperation with a suitable reading-scale serves to indicate the amount of energy stored in the battery in charging and remaining in the battery in discharging. The meter illustrated is adapted to measure in units of kilowatt-hours.

The meter is provided with a supplemental-pressure winding divided into stationary coils 27 27, this being the form of supplemental-meter winding I prefer to employ. A rheostat resistance 28 is included in series with the coils 27 27. A solenoid 29, controlling the rheostat-arm is included in the branch conductor 5. Upon an increase in the battery discharge the strength of this magnet is increased and resistance of the rheostat cut out of circuit. Upon a decrease in the battery discharge the magnet is weakened and resistance cut into circuit with the winding 27. In this manner the speed of the meter is changed per unit of load or energy according to the degree of battery discharge. The winding 27 is provided with terminals 27' 27', which engage the blades of the switch 10 only when the battery is connected with the translating means, this supplemental winding being removed while the battery is being charged.

When the switch is thrown to the right, the branch conductor 4 is disconnected, whereupon the meter-circuit is completed by way of the conductor 5.

Having thus described my invention, I claim as new and desire to secure by Letters Patent—

1. The combination with a storage battery, of a meter receiving current therefrom, and means for varying the strength of the field due to a winding operated by the current flowing from the battery and varying in its operation according to the rate of battery discharge, whereby the rate of operation of the meter per unit of load or energy may be varied according to the varied battery discharge, substantially as described.

2. The combination with a storage battery, of a meter receiving current therefrom, a rheostat included in circuit with a meter-winding, and an electromagnetic device in series with the battery serving, according to the rate of battery discharge, to include more or less of the resistance of the rheostat in circuit with said meter-winding to compensate for variation in battery discharge, substantially as described.

3. The combination with a storage battery, of a meter receiving current therefrom, a rheostat included in circuit with a meter-winding, and an electromagnetic device in series with the battery and serving, according to the battery discharge, to include more or less of the resistance of the rheostat in circuit with said meter-winding to compensate for variation in battery discharge, the said meter-winding being subject to the pressure of the battery, substantially as described.

4. The combination with a storage battery, of a meter receiving current therefrom, a supplemental winding for the meter, a rheostat included in circuit with said supplemental winding, and an electromagnetic device in series with the battery and serving according to the rate of battery discharge to include more or less of the resistance of the rheostat in circuit with said meter-winding to compensate for variation in battery discharge, substantially as described.

5. The combination with a storage battery, of a meter receiving current therefrom, a supplemental-pressure winding for the meter, a rheostat included in circuit with said supplemental winding, and an electromagnetic device in series with the battery and serving, according to the rate of battery discharge, to include more or less of the resistance of the rheostat in circuit with said meter-winding to compensate for variation in battery discharge, substantially as described.

6. The combination with a storage battery, of a meter receiving current therefrom, a supplemental winding for the meter, a rheostat included in circuit with said supplemental winding, an electromagnetic device in series with the battery and serving, according to the rate of battery discharge, to include more or less of the resistance of the rheostat in circuit with said meter-winding to compensate for variation in battery discharge, and a switching device for including the said supplemental winding in circuit when the battery is connected with the translating means and excluding the same from circuit when the battery is connected with the charging-circuit, substantially as described.

7. The combination with a storage battery, of a meter receiving current therefrom, a supplemental-pressure winding for the meter, a rheostat included in circuit with said supplemental winding, an electromagnetic device in series with the battery and serving, according to the rate of battery discharge, to include more or less of the resistance of the rheostat in circuit with said meter-winding to compensate for variation in battery discharge, and a switching device for including the said supplemental winding in circuit when the battery is connected with the translating means and excluding same from circuit when the battery is connected with the charging-circuit, substantially as described.

8. The combination with a storage battery, of a meter receiving current therefrom, and means for varying the strength of the field due to a winding operated by the current flowing from the battery and varying in its operation according to the rate of battery discharge, substantially as described.

9. The combination with a storage battery, of a meter receiving current therefrom, a rheostat included in circuit with a meter-winding, and an electromagnetic means in series with the battery serving, according to the rate of battery discharge, to include more or less of the resistance of the rheostat in circuit with said meter-winding to compensate for variation in battery discharge, substantially as described.

10. The combination with a storage battery, of a meter receiving current therefrom, a rheostat included in circuit with a meter-winding, and an electromagnetic means, serving to include more or less of the resistance of the rheostat in circuit with said meter-winding to compensate for variation in battery discharge, substantially as described.

11. The combination with a storage battery, of a meter to measure the current passing through the battery, means for varying the rate of operation of said meter per unit of load or energy, and electromagnetic means in series with the battery to control the variation in the rate of operation of the said meter, substantially as described.

12. The combination with a storage battery, of a meter provided with current and pressure windings, means for varying the field due to the pressure-winding, and electromagnetic means in series with the battery to be thereby subject to the varying current discharged from the battery to vary the torque according to the rate of battery discharge to correspondingly alter the rate of operation of the meter per unit of load or energy, substantially as described.

13. The combination with a storage battery, of a meter provided with current and pressure windings, means for varying the field due to one of said windings, and electromagnetic means in series with the battery to be thereby subject to the varying current discharged from the battery, to vary the torque according to the rate of battery discharge to correspondingly alter the rate of operation of the meter per unit of load or energy, substantially as described.

14. The combination with a storage battery, of a meter provided with current and pressure windings, means for varying the field due to one of the said windings, and electromagnetic means in series with the battery to be thereby subject to the varying current discharged from the battery, to control the variation in the field due to one of said windings to correspondingly alter the rate of operation of the meter per unit of load or energy, substantially as described.

In witness whereof I hereunto subscribe my name this 16th day of August, A. D. 1901.

THOMAS DUNCAN.

Witnesses:
 GEORGE L. CRAGG,
 HERBERT F. OBERGFELL.